3,392,028
FERMENTATION OF TEA
Luc Vuataz, Vevey, Switzerland, assignor to Afico S.A., Lausanne, Switzerland, a corporation of Switzerland
No Drawing. Filed Nov. 16, 1964, Ser. No. 411,575
Claims priority, application Switzerland, Nov. 27, 1963, 14,529/63
11 Claims. (Cl. 99—76)

ABSTRACT OF THE DISCLOSURE

Fresh tea is fermented in aqueous suspension at a pH below the natural pH of an aqueous suspension of the tea, most preferably in range 3.7 to 4.5, in the presence of oxygen. Fermentation at reduced pH suppresses formation of thearubigins and improves the ratio of theaflavins to thearubigins. Other features of the invention appear in the following specification.

---

The present invention is concerned with improvements in the fermentation of fresh tea, and with the production of extracts from the fermented fresh tea.

The term "fresh tea" as used in this specification is intended to mean not only the unfermented leaves of the tea tree (*Thea sinensis*), but also the bud and the stem to which the leaves are attached. The term is also intended to include fresh tea leaves which have been withered.

The fermentation of fresh tea is essentially an oxidation reaction, in which some of the flavanols present in the fresh tea are oxidized to different substances, the most interesting of which, from the point of view of colour and flavour, are the theaflavins. As the fermentation proceeds, the theaflavins are in turn transformed into thearubigins, the quantities in which these classes of substances are formed depending on the method of fermentation employed and on the chemical composition of the fresh tea used. Although we do not wish to be limited by theoretical considerations, it appears that the transformation of theaflavins into thearubigins is, in part, an oxidation reaction.

Black tea contains both theaflavins and thearubigins, in quantities depending on the method of fermentation employed. From the point of view of taste, it is the theaflavins which give to black tea its characteristic astringency, the thearubigins being only mildly astringent.

Theaflavins are orange-red in colour; their visible spectrum has 2 maxima, at about 375 and 455 m$\mu$. The thearubigins are brown in colour and their visible spectrum does not have a maximum.

Tea extracts, or "instant teas," have usually been prepared by extraction of black tea. However, such extracts have been observed to lack the characteristics of a black tea infusion, particularly with respect to colour and flavour, especially astringency. Frequently also, such extracts tend to form a scum with hard water, which produces an unfavourable reaction in the consumer.

It is an object of the present invention to provide a method of fermenting fresh tea whereby a fermented tea is obtained which has a high content of theaflavins and a low content of thearubigins.

It has been found that the formation of thearubigins during the fermentation of fresh tea may be suppressed to a considerable extent if the fermentation is carried out in aqueous suspension, at a pH which is below the natural pH of a suspension of comminuted fresh tea. As indicated above, thearubigins are formed by the transformation of theaflavins. However, if the pH of the fresh tea is lowered, transformation of theaflavins to thearubigins is suppressed to a certain degree while the reaction leading to the formation of theaflavins is suppressed to a much smaller extent. It is thus possible to obtain a fermented tea from which extracts may be prepared having a high ratio of theaflavins to thearubigins and consequently having the desirable astringency and orange-red colour of a high quality black tea infusion.

According to the invention, therefore, there is provided a method of fermenting fresh tea which comprises subjecting an aqueous suspension of comminuted fresh tea to the action of oxygen at a pH which is below the natural pH of an aqueous suspension of the fresh tea used.

As indicated above the transformation of theaflavins into thearubigins is influenced by the action of oxygen. The oxygen present increases the rate of the theaflavin-producing reaction which has been slightly decreased by the lowering of pH, while the higher theaflavin-thearubigin ratio, made possible by the reduction in pH, remains unaffected.

It should be understood that the natural pH of an aqueous suspension of fresh tea varies with the type and origin of the tea and is, of course, dependent on the water used for preparing the suspension. Usually, it lies between 5 and 6, but this range of values is only a guide. The preferred pH range for conducting the fermentation according to the invention is 3 to 5, advantageously 3.7 to 4.5. The pH is conveniently adjusted by the addition of an acid, for example, phosphoric acid, hydrochloric acid or sulphuric acid. Mixtures of two or more acids may also be used. Alternatively, the pH of the suspension may be lowered by treatment with a cation-exchange resin. When the pH is adjusted by means of an ion-exchange resin, it may be convenient to treat a portion of the suspension with the resin, thereby substantially lowering the pH, for example to 2, and to add a suitable quantity of the treated suspension to the remainder of the suspension to be fermented to give the desired pH. It is also possible to arrive at the desired low pH by using decationized water for the preparation of the suspension.

If desired, the above procedure of lowering the pH by means of an ion-exchange resin may be modified by first removing the coarser tea fragments from the suspension, for example by filtration, decanting or centrifuging, and treating the resulting liquid with the resin to lower the pH. After the treatment the resin may be removed, the treated liquid may be recombined with the separated fragments and the fermentation effected as described. Alternatively, the resin may be placed in a porous container or bag (e.g. a nylon sack), and the container or bag introduced directly into the suspension, without removing any of the coarse fragments. Thus it is possible to recover the resin, which may then be regenerated and used for a further batch.

The fresh tea may be comminuted by any convenient method, for example by chopping, mincing or macerating. Advantageously, the fresh tea is comminuted in aqueous suspension to fragments which are, on the average, 1–2 mm. in size, there being, of course, minor proportions of fragments which are larger and smaller. The suspension thus produced may then be subjected to fermentation after the pH has been adjusted. It is also possible to use tea which has been withered.

As stated, the fermentation of the fresh tea is effected in aqueous suspension. Preferably, the suspension contains about 1 part by weight of fresh tea for every 1 to 10, advantageously 3 to 4, parts by weight of water. The actual ratio of tea to water to be used will depend on the further treatment to which it is desired to subject the fermented tea. A smaller quantity of water is advantageously used when a dry extract or a high-solids concentrate is to be prepared since less water has to be evaporated in the later stages of production.

The degree of fermentation may also be controlled by the temperature. Since the formation of theaflavins during the fermentation is an enzymic reaction, it is preferable to work at temperatures which are close to the temperature of optimum activity of the enzymes, that is, at 35 to 40° C. However, satisfactory results may be obtained at temperatures in the range 25 to 55° C.

Further factors whereby the fermentation may be influenced are the duration of the oxygenation and the quantity of oxygen introduced. Since oxygen is used up in the formation of both theaflavins and thearubigins, the quantity of oxygen supplied should, as far as possible, be sufficient for the formation of theaflavins but insufficient to allow the formation of substantial quantities of thearubigins. It has been noted that the two reactions are "competitive," the second one being slowed down by the low pH. Preferably, the volume of oxygen supplied is equivalent to 1 to 4 times the volume of the suspension. If desired the total quantity of oxygen may be introduced before fermentation or alternatively continuously during the course of the whole fermentation.

The actual duration of fermentation will again depend on the characteristics desired for the final product. The time may vary from 3 minutes when large quantities of oxygen are supplied to about 120 minutes when less oxygen is used. Usually, about 10 minutes is satisfactory, which compares very favorably with the much longer times required for the fermentation of fresh tea by classical methods.

In order that the fermentation may proceed smoothly, it is desirable that the oxygen be homogeneously distributed throughout the bulk of the suspension. This may be achieved, for example, by stirring the suspension, by carrying out the fermentation in a rotating cylinder or by using any of the conventional devices which facilitate the uniform diffusion of a gas throughout a liquid medium. This procedure has the further advantage that a shorter reaction time is required.

Advantageously, the fermentation is conducted in a closed vessel, the oxygen being supplied close to the surface of the suspension, or being passed into the suspension itself. Alternatively oxygen-enriched air, or pure oxygen, optionally under pressure, may be used. When using pure oxygen, the fermentation proceeds more quickly and again shorter reaction times are possible.

It has also been observed that the formation of thearubigins is influenced to a certain degree by the chloroplasts which are present in fresh tea. In some cases, it may be desirable to eliminate these particles to a greater or lesser extent before the tea is fermented. The chloroplasts may be separated by preparing a suspension of comminuted fresh tea, removing the tea fragments, e.g. by screening, decanting or filtration, and then removing the fine chloroplast particles by filtration through a fine filter or by centrifuging. The resulting clear liquid may then be added to the tea fragments and the suspension fermented.

When the desired degree of fermentation has been reached, the oxygenation may be stopped and preferably the suspension is heated to inactive the enzymes, for example to 70–100° C. It has also been found that the ratio of theaflavins to thearubigins may be increased when the suspension is heated after fermentation. When the fermentation is effected with vigorous agitation of the suspension, it is usually sufficient to stop the agitation in order to arrest the fermentation.

The method of fermenting fresh tea according to the invention is particularly useful for the preparation of fermented teas from which extracts, in powder or liquid form, may be conveniently prepared by extraction with water.

For example, when the desired degree of fermentation has been reached, the suspension may be heated to extract the soluble matter remaining in the fermented tea. After extraction, the remaining solid matter may be removed, for example by filtration or centrifuging and the aqueous extract concentrated and, if desired dried by suitable means, for example by spray- or freeze- or roller drying.

If desired, the fermented suspension may also be subjected to an aroma-stripping operation before or after the extraction, and the aroma components thus obtained may be added to the extract.

Depending on the conditions employed during the fermentation, it is possible to prepare extracts containing varying amounts of theaflavins and thearubigins. Extracts having a high theaflavin-thearubigin ratio may be added to conventional tea extracts prepared from black tea. Extracts in which, after reconstitution, the ratio of theaflavins to thearubigins is similar to that of black tea infusions may also be prepared.

A further advantage of the method of fermenting fresh tea according to the invention is that one may prepare extracts containing only a small proportion of thearubigins, and such extracts have a decreased tendency to form a "scum" with hard waters since it is principally the thearubigins, and not the theaflavins, which lead to the formation of scum.

It should also be noted that by fermenting fresh tea according to the invention it is possible to produce tea extracts actually in the tea-producing countries, thereby making savings in transport of black tea which is a bulky commodity.

The following examples are given for the purposes of illustration only:

Example 1.—Estimation of theaflavins and thearubigins

I. THEAFLAVINS

The pH of 100 mls. of an aqueous solution containing 0.5 to 1.0 gm. soluble tea solids is adjusted to 5.0 and the solution shaken twice for 5 minutes with 200 mls. of an 8:2 (v./v.) ethyl acetate/petroleum ether mixture.

The organic solutions (1 and 2) are each made up to 200 mls. The dissolved solvents are removed from the aqueous solution under vacuum and the solution made up to 100 mls. (solution 3).

One then proceeds as follows:

(a) 2 mls. of solution 1 are mixed with 2 mls. of reagent (2% (w./v.) solution of Flavognost (Heyl & Co., Berlin) in ethanol and 2 mls. ethanol are added. After shaking and standing for 15 minutes at room temperature, the extinction coefficient is measured at 600 m$\mu$=$x_1$, using 2 mls. of solution 1+4 mls. ethanol as blank.

The same procedure is repeated with solution 2, giving $E_{600}$ m$\mu$=$x_2$.

Then $$100(x_1+x_2)=VTF_{600}$$

$VTF$=theaflavin value.

To obtain VTF, one multiplies $VTF_{600}$ by 6.6. (The factor 6.6 was established experimentally, by analysing pure theaflavins.)

(b) 2 mls. of solution 1 are mixed with 8 mls. of 8:2 (v./v.) ethyl acetate/petroleum ether mixture and $E_{455}$ m$\mu$(=$y_1$) measured against water.

$E_{455}$ m$\mu$ of solution 2 (=$y_2$) is then determined without dilution.

Then $$VTF'=200(5y_1+y_2)$$

$VTF'$ is greater than $VTF$ because of the small quantity of thearubigins which was extracted by the solvent mixture. For pure theaflavins, $VTF'=VTF$.

II. THEARUBIGINS 2 mls. of solution 3 obtained as described above are mixed with 10 mls. of water and made up to 100 mls. with ethanol.

$E_{455}$ mµ is then measured ($=z$).

Then

5000 $z=VTR'$ (thearubigin value)

$VTR=VTR'+VTF'-VTF$

Total value (VT) of theaflavins and thearubigins is obtained by adding VTF and VTR. VTF is then calculated as a percentage of VT.

The following is a typical set of values obtained by the method described above for an infusion prepared from 2 gm. Ceylon tea in 100 mls. water. The values may be calculated either for 100 mls. of infusion (a) of for 1 gm. of soluble dry solids (b).

|     | VTF | VTR | VT | Percent VTF/VT |
|-----|-----|-----|-----|-----|
| (a) | 45  | 225 | 270 | 16.7 |
| (b) | 75  | 375 | 450 | 16.7 |

Example 2

100 gm. of fresh tea are macerated in 360 gm. water at 4° C. in a "Turmix" macerator provided with a lid. The suspension is then stirred slowly with gentle warming until the temperature reaches 30° C. The pH is then adjusted to 4.6 by adding N hydrochloric acid, the air is replaced by oxygen and the suspension agitated vigorously for 20 minutes, oxygen being passed in just above the surface.

A portion of the suspension is taken for determination of the VTF and VTR. Sufficient ethanol is added to give a 40% (v./v.) ethanol concentration, the suspension is stirred gently for 5 minutes at 40° C. and is then filtered. The filtered residue is extracted again with 40% (v./v.) ethanol and treated as described above. The extracts are then combined and the ethanol completely removed in vacuo. The resulting aqueous solution is used for the determination of the VTF and VTR.

The VTF and VTR of the extract, based on 1 gm. dry soluble solids, were as follows:

VTF _____ 600
VTR _____ 680
VT _____ 1280
Percent $VTF/VT$ _____ 46.9

The above procedure was repeated, but the fermented suspension was heated at 70° C. for 5 minutes.

The following values were obtained:

570   575   1145   49.8

Example 3.—Influence of pH on fermentation 100 gm. portions of green tea are fermented as described in Example 2, at pH 4.6, 4.3, 4.0 and 3.7, but the reaction temperature is 38° C. and the time of oxygenation 10 minutes.

The following results were obtained, the values being expressed in terms of 1 gm. of dry soluble solids:

| pH | VTF | VTR | VT | Percent VTF/VT |
|-----|-----|-----|-----|-----|
| 4.6 | 395 | 550 | 945 | 41.8 |
| 4.3 | 505 | 555 | 1,060 | 47.6 |
| 4.0 | 585 | 385 | 970 | 60.3 |
| 3.7 | 480 | 355 | 835 | 57.5 |

It will be observed that the optimum pH under the conditions of fermentation selected is 4.0.

Example 4.—Influence of temperature on fermentation 100 gm. portions of fresh Ceylon (low grown) tea are fermented in the presence of pure oxygen at pH 4.3 for 10 minutes at 38, 43 and 48° C., as described in Example 2. The following results, based on 1 gm. of dry soluble solids, were obtained:

| Temperature, °C.: | VTF | VTR | VT | Percent VTF/VT |
|-----|-----|-----|-----|-----|
| 38 | 450 | 565 | 1,015 | 44.3 |
| 43 | 520 | 770 | 1,290 | 40.3 |
| 48 | 395 | 635 | 1,030 | 38.4 |

Example 5.—Influence of time

Three 100 gm. portions of fresh tea (grown in the Ile de la Réunion) are fermented for 25, 30 and 35 minutes at 30° C. and pH 4.6, as described in Example 2.

The following results, based on 1 gm. dry soluble solids, were obtained:

| Time (minutes): | VTF | VTR | VT | Percent VTF/VT |
|-----|-----|-----|-----|-----|
| 25 | 800 | 740 | 1,540 | 52.3 |
| 30 | 740 | 860 | 1,600 | 46.3 |
| 35 | 695 | 810 | 1,505 | 46.4 |

Example 6.—Influence of ratio fresh tea:water on fermentation 100 gm. portions of fresh Ceylon (low grown) tea are fermented in aqueous suspension for 10 minutes at 40° C. and pH 4.0, the volume of oxygen supplied being twice the volume of the suspension.

The results obtained are summarized below:

| Ratio fresh tea:water (w./w.) | VTF | VTR | VT | Percent VTF/VT |
|-----|-----|-----|-----|-----|
| 1:3 | 525 | 560 | 1,085 | 48.4 |
| 1:4.5 | 535 | 540 | 1,075 | 49.8 |
| 1:6 | 590 | 565 | 1,155 | 51.1 |

The values refer to 1 gm. of dry soluble solids.

Example 7.—Influence of quantity of oxygen introduced 100 gm. of fresh tea are macerated in 360 gm. water and the pH adjusted to 4.3. The suspension is placed in a 1 litre jar and warmed to 38° C. The jar is closed with a lid provided with a gas inlet tube and having a hole for a stirrer.

The suspension is agitated vigorously, oxygen being introduced through a tube just above the surface of the suspension.

This procedure was repeated four times, different quantities of oxygen being introduced each time.

The results obtained are summarized in the following table:

| Volume of oxygen introduced during 10 minutes (in litres) | VTF | VTR | VT | Percent VTF/V |
|-----|-----|-----|-----|-----|
| 15 | 445 | 780 | 1,225 | 36.3 |
| 2 | 495 | 695 | 1,190 | 41.6 |
| 0.5 | 610 | 620 | 1,230 | 49.6 |
| 0.2 | 610 | 605 | 1,215 | 50.2 |

The values stated refer to 1 gm. of dry soluble solids.

Example 8.—Fermentation of fresh tea stems 100 gm. of comminuted fresh tea stems from which all the leaves had been completely removed are fermented for 10 minutes at 38° C. and pH 4.3 by the method described in general in Example 2.

The following results, stated in terms of 1 gm. dry soluble solids, were obtained:

VTF _____ 400
VTR _____ 610
VT _____ 1010
Percent $VTF/VT$ _____ 39.6

Example 9.—Fermentation after separation of chloroplasts 100 gm. of fresh tea are introduced into 360 gm. water at 4° C. and comminuted in a "Turmix" macerator. The pH is then adjusted to 4.6 with hydrochloric acid and the temperature to about 30° C.

The suspension is filtered through a nylon cloth and the tea fragments are pressed. The turbid green liquid is then centrifuged, giving a green sediment and a clear supernatant liquid. The liquid is added to the separated solid matter and the resulting suspension stirred vigorously for 10 minutes at 38° C. in an atmosphere of oxygen.

The following results were obtained:

| | |
|---|---|
| VTF | 700 |
| VTR | 640 |
| VT | 1340 |
| Percent *VTF/VT* | 52.2 |

Example 10.—Use of ion-exchange resin for adjustment of pH 100 gm. of fresh tea are comminuted in 360 gm. water. 3 gm. of Dowex-50-X-16 (H) cation exchange resin, in a nylon bag, are placed in the suspension and the suspension is stirred. After several minutes, when the pH reaches 4.3, the resin is removed and the suspension then fermented for 10 minutes at 38° C. The following results calculated on 1 gm. of dry soluble solids were obtained:

| | |
|---|---|
| VTF | 580 |
| VTR | 490 |
| VT | 1070 |
| Percent *VTF/VT* | 54.2 |

Example 11

A suspension prepared from 100 parts by weight of comminuted fresh tea and 360 parts by weight of water is filtered through a nylon filter cloth. The filtrate is treated with 2 parts by weight of Amberlite IR 120 (H) cation exchange resin to lower the pH to 4.0 and then the resin is removed. The liquid is added to the tea fragments which remained on the filter cloth and the suspension vigorously stirred in the presence of oxygen for 10 minutes at 40° C.

The VTF and VTR of the liquid phase are then determined, giving the following results which are based on 1 gm. dry soluble solids:

| | |
|---|---|
| VTF | 585 |
| VTR | 400 |
| VT | 985 |
| Percent *VTF/VT* | 59.4 |

What is claimed is:

1. A method of fermenting fresh tea which comprises subjecting an aqueous suspension of fresh tea to the action of oxygen at a pH which is below the natural pH of an aqueous suspension of the fresh tea used.

2. A method according to claim 1, wherein the pH of the suspension is within the range 3.7 to 4.5.

3. A method according to claim 1, wherein said suspension contains 1 part by weight of comminuted fresh tea for every 1 to 10 parts by weight of water.

4. A method of fermenting fresh tea which comprises subjecting to the action of oxygen an aqueous suspension of comminuted fresh tea, the pH of said suspension being below the natural pH of an aqueous suspension of the fresh tea used and within the range pH 3 to pH 5, said suspension containing 1 to 10 parts by weight of water for each part by weight of fresh tea.

5. A method according to claim 4 wherein the pH of the suspension is adjusted by adding an acid thereto.

6. A method of fermenting fresh tea which comprises subjecting to the action of oxygen, at a pH of 3 to 5 and at a temperature of 35 to 40° C., an aqueous suspension of comminuted fresh tea, said suspension containing about 3 to 4 parts by weight of water for each part by weight of tea and being at a pH below the natural pH of an aqueous suspension of the fresh tea used.

7. A method according to claim 6, wherein the quantity of oxygen supplied is equivalent to 1 to 4 times the volume of the suspension.

8. A method of fermenting fresh tea which comprises providing an aqueous suspension of comminuted fresh tea, said suspension being at a pH below the natural pH of an aqueous suspension of the fresh tea used and having a pH value of 3 to 5 and containing 1 to 10 parts by weight of water for each part by weight of fresh tea, supplying oxygen to said suspension for a period of 3 to 120 minutes at a temperature of 25 to 55° C., said suspension being agitated whilst oxygen is being supplied, and heating said suspension to a temperature of 70 to 100° C. when the desired degree of fermentation has been reached.

9. A process for producing a tea extract which comprises fermenting tea by the method according to claim 8, extracting said fermented tea with water to provide an aqueous extract of fermented tea, and concentrating the aqueous extract.

10. A process according to claim 9 including the further step of drying the concentrate.

11. The tea extract obtained by the process of claim 10.

References Cited

UNITED STATES PATENTS

| | | | |
|---|---|---|---|
| 2,927,860 | 3/1960 | Seltzer et al. | 99—77 |

FOREIGN PATENTS

| | | |
|---|---|---|
| 8,049 | 6/1961 | Japan. |
| 8,700 | 6/1961 | Japan. |

MAURICE W. GREENSTEIN, *Primary Examiner.*